(12) United States Patent
Samenfink et al.

(10) Patent No.: US 7,881,857 B2
(45) Date of Patent: Feb. 1, 2011

(54) METHOD FOR OPERATING AN INTERNAL COMBUSTION ENGINE

(75) Inventors: Wolfgang Samenfink, Besigheim (DE); Andreas Kufferath, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 21 days.

(21) Appl. No.: 12/083,445

(22) PCT Filed: Sep. 26, 2006

(86) PCT No.: PCT/EP2006/066758

§ 371 (c)(1),
(2), (4) Date: Jul. 10, 2009

(87) PCT Pub. No.: WO2007/048676

PCT Pub. Date: May 3, 2007

(65) Prior Publication Data

US 2009/0299604 A1    Dec. 3, 2009

(30) Foreign Application Priority Data

Oct. 28, 2005  (DE) ................ 10 2005 051 701

(51) Int. Cl.
  *G06F 19/00*   (2006.01)
  *F02D 41/14*   (2006.01)
  *F02D 41/40*   (2006.01)
  *F02M 51/00*   (2006.01)

(52) U.S. Cl. .................. 701/105; 701/104; 123/299
(58) Field of Classification Search .......... 123/295, 123/299, 300, 305, 435, 436, 478, 480, 486, 123/490; 701/101–105, 110–115
See application file for complete search history.

(56) References Cited

U.S. PATENT DOCUMENTS

| 6,125,823 A | * | 10/2000 | Thomas | 123/299 |
| 6,722,345 B2 | * | 4/2004 | Saeki et al. | 701/105 |
| 6,755,176 B2 | * | 6/2004 | Takeuchi et al. | 123/299 |

FOREIGN PATENT DOCUMENTS

| EP | 0 947 686 | 10/1999 |
| EP | 1 450 029 | 8/2004 |
| FR | 2 857 700 | 1/2005 |
| WO | WO 99/61771 | 12/1999 |

* cited by examiner

*Primary Examiner*—Willis R Wolfe, Jr.
(74) *Attorney, Agent, or Firm*—Kenyon & Kenyon LLP

(57) ABSTRACT

In a method for operating an internal combustion engine, the fuel is supplied to at least one combustion chamber via at least one injector, which method includes the following steps: a) a total injection is divided into a basic injection and at least one measured injection; b) the injection time of the measured injection is successively decreased and the injection time of the basic injection is successively increased so that a total injection quantity ascertained from a valve characteristic curve remains the same.

9 Claims, 5 Drawing Sheets

METHOD FOR OPERATING AN INTERNAL COMBUSTION ENGINE

BACKGROUND OF THE INVENTION

1. Field of the Invention

The present invention relates to a method and a device for operating an internal combustion engine, in which the fuel is supplied to at least one combustion chamber via at least one injector, and in which a characteristic curve of the injector is adjusted.

2. Description of Related Art

Internal combustions engines having gasoline injection into an intake manifold as well as direct gasoline injection into the particular combustion chambers are known. The gasoline is injected by at least one injector. This injector must cover a wide quantity range. As a rule, the range extends from the idle point, or also from a fired overrun, which defines a minimum quantity, to full load at high speeds, which defines a maximum quantity.

The fuel quantity injected by the injector ideally has a linear correlation to the opening time of the injector. However, a very broad linear range means that the cost of manufacturing the injector is comparatively high. This manufacturing cost increases in proportion to the need to minimize undesired deviations from the linearity, particularly in the low-volume range. In this range, in particular, the scatter between the individual injectors may be comparatively high, which makes generally applicable and non-valve-specific corrections more difficult.

To prevent, or at least limit, the injection of different fuel quantities into the individual combustion chambers of an internal combustion engine, a method known from the market is used to set a lower limit to the minimum injection time. An adjustment by which the characteristic curve of an injector is adjusted to the actual conditions is also possible. In an internal combustion engine having direct gasoline injection, for example, the running smoothness while idling in stratified-charge mode may be used for an adjustment of this type. In internal combustion engines having intake manifold injection, a so-called "single-cylinder lambda regulation" method may be used. While the first method is usable only for specific internal combustion engines, the second method requires a comparatively well-defined operating point.

An object of the present invention is to provide a method which enables the injection performance of an injector to be tested even when the internal combustion engine is operating in normal mode.

BRIEF SUMMARY OF THE INVENTION

In the method according to the present invention, the injector test is barely or not at all apparent to the user of the internal combustion engine, since the total injection quantity is largely constant at least during a portion of the test, and the torque and running smoothness therefore also remain the same. As a result, the test may be carried out frequently, which increases the operational reliability of the internal combustion engine overall.

According to a first refinement, it is proposed that a deviation of a variable characterizing an actual air/fuel mixture, induced by successively shortening the duration of the measured injection, from a variable characterizing a setpoint air/fuel mixture, be detected, and the deviation or a characteristic curve of the injector is adjusted or corrected. The injected fuel quantity is therefore reliably detected in the low-volume range, in which a deviation of the actually injected actual fuel quantity from the setpoint fuel quantity, which is determined on the basis of the applied characteristic curve, is impermissibly large for an individual injector. The method is equally suitable for both internal combustion engines having intake manifold injection and for internal combustion engines having direct fuel injection. It is therefore no longer necessary to generally limit the minimum injection time. This facilitates reliable and precise fuel metering even in the low-volume range, which improves running smoothness, for example in idle mode, and reduces harmful emissions. An additional sensor system or special components, for example a specially designed manifold, are not necessary.

It goes without saying that, at the start of the method, the injection time of the basic injection and that of the measured injection lie in a range of the valve characteristic curve in which it may be assumed that a scatter of values has only a minimal effect. The determination of whether the actual air/fuel mixture deviates from the setpoint air/fuel mixture may be made, for example by monitoring the lambda value provided by a lambda sensor. However, it is also possible to use other methods for determining the quantity of fuel actually supplied to the combustion chamber.

The embodiment of the present invention in which the deviation is quantified in the form of an error injection quantity, and the injector characteristic curve is adjusted accordingly, is particularly advantageous. In this manner, the injector operating range in which the fuel is injectable with a high degree of precision is extended to the minimum-volume range, since the injector-specific scatter of values is compensated by the characteristic curve adjustment. Due to the method according to the present invention, the complexity of the injector design may also be reduced, since the linearity of the characteristic curve no longer plays such an important role, due to the adjustment that in any case takes place during operation. The output stage needed for driving the injector may also be given a simpler design. All of this is reflected in lower manufacturing costs.

The injector characteristic curve is adjustable, in particular, by repeating the method and using successively shorter injection times of the measured injection. Adjusting the basic injection quantity by the error injection quantity has the advantage of avoiding greater deviations of the actual mixture from the setpoint mixture while carrying out the method according to the present invention, so that only minor, if any, running unevenness occurs while carrying out the method according to the present invention. In this manner, the exhaust gas behavior also remains within a tolerable range while carrying out the method according to the present invention. This is particularly true if the error injection quantity is also adjusted so that the variable characterizing the actual mixture deviates from the variable characterizing the setpoint mixture by less than a limiting value.

To limit the duration of the method according to the present invention, the method may be ended when the measured injection duration reaches at least a lower limiting value. The resolution, in turn, may be increased if a total injection includes multiple measured injections of equal length.

It is particularly advantageous if the scope of the adjustment is used for diagnosing the injector. This is based on the idea that, if the actual valve characteristic curve deviates substantially from the applied valve characteristic curve, an error in the injector may be assumed. For example, this error may be a short-circuit in a coil winding of a magnet coil that belongs to an actuator of the injector. Very short injection times of an injector, in particular, are varied to a particularly great degree by a short-circuit of this type.

DETAILED DESCRIPTION OF THE INVENTION

Figure 1:
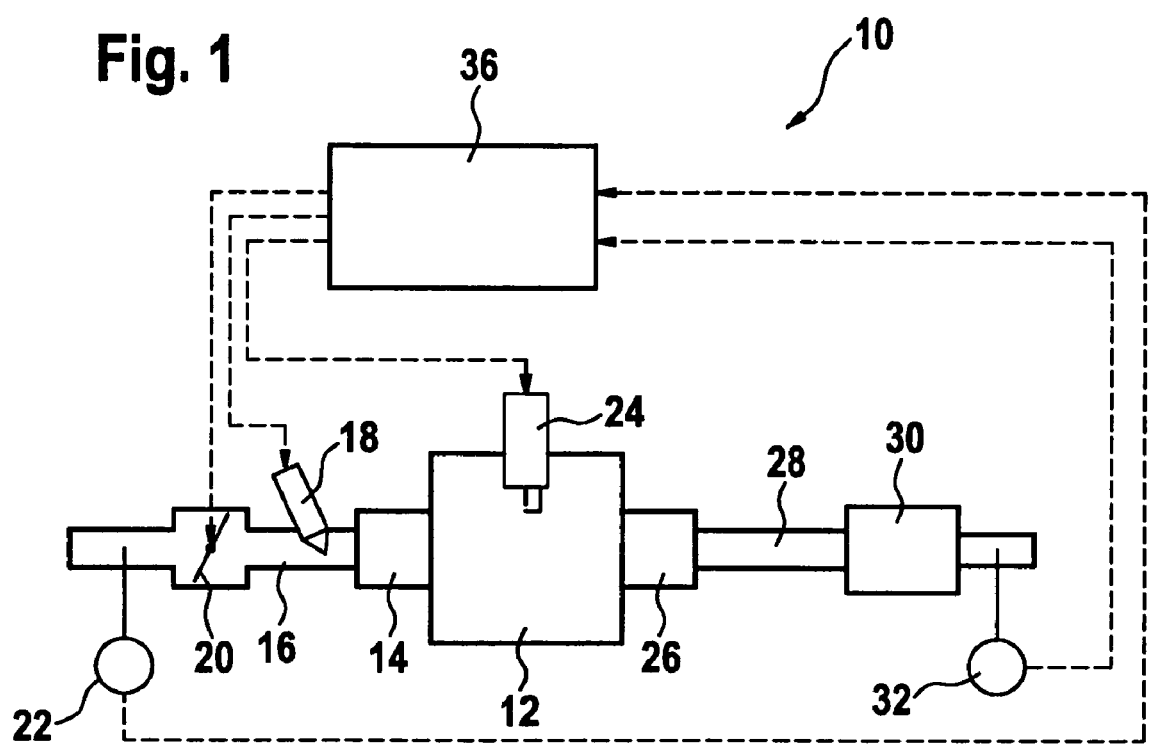
FIG. 1 shows a schematic representation of an internal combustion engine having intake manifold injection by an injector.

In FIG. 1, an internal combustion engine is identified as a whole by reference numeral 10. The internal combustion engine includes multiple cylinders having multiple combustion chambers, only one of which, however, is shown in FIG. 1, identified by reference numeral 12. Combustion chamber 12 is connectable to an intake manifold 16 via an intake valve 14.

In the present exemplary embodiment, fuel is injected therein via an injector 18. However, the operating principles and method described below are also applicable to internal combustion engines having direct fuel injection, for example direct gasoline injection. A throttle valve 20 is also situated in intake manifold 16. In the present exemplary embodiment, the air mass flowing in intake manifold 16 is detected by an air mass sensor 22.

The air/fuel mixture present in combustion chamber 12 is ignited by a spark plug 24. Hot combustion exhaust gases are discharged from combustion chamber 12 to an exhaust pipe 28 via an exhaust valve 26. A catalytic converter 30 is situated therein, along with a lambda sensor 32, which detects a lambda value used to characterize the air/fuel mixture in combustion chamber 12.

Figure 2:
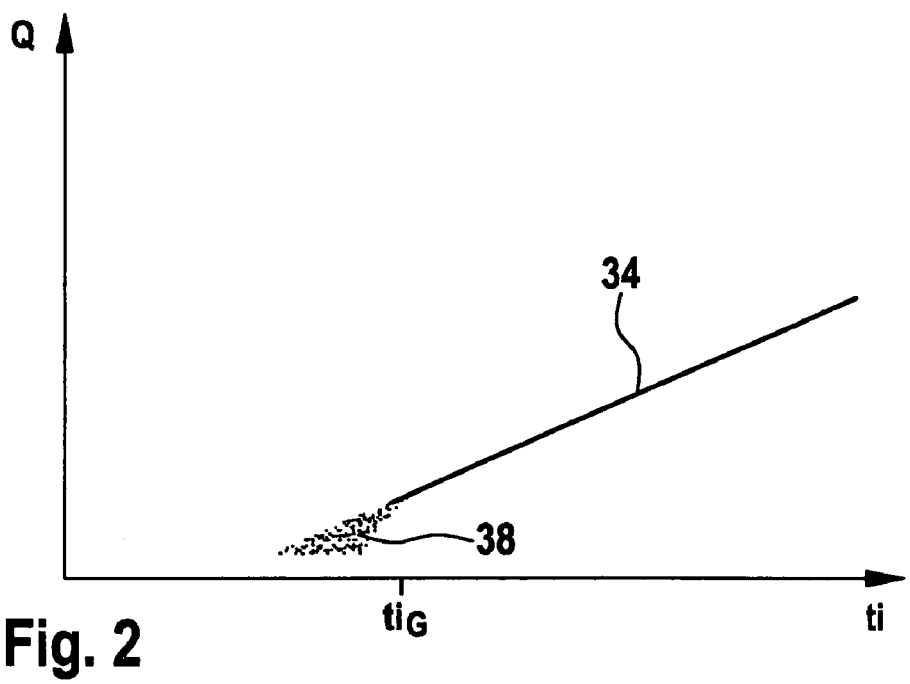
FIG. 2 shows a diagram in which a characteristic curve of the injector from FIG. 1 is illustrated, the characteristic curve linking an opening time with an injected fuel quantity.

A fuel quantity Q injected into intake manifold 16 by injector 18 is influenced primarily by injection time ti of injector 18, at a constant fuel pressure. In designing injector 18, importance is attached to the fact that the correlation between injection time ti and injected fuel quantity Q, which, as shown in FIG. 2, is expressed by a characteristic curve 34, is linear within a broad operating range of injector 18. Characteristic curve 34 is stored in a control and regulating device 36 (FIG. 1), which drives injector 18 as well as throttle valve 20 and spark plug 24 as a function of different sensor signals, for example the signals of lambda sensor 32 and air mass sensor 22.

Due to manufacturing-related scatter of values from one injector to another, injector 18 has a non-linear performance in the case of short injection times ti or small injection quantities Q. The corresponding range is illustrated by dots in FIG. 2 and identified by reference numeral 38. As further illustrated in FIG. 3, fuel quantity Q injected in this range is smaller than the quantity that would correspond to linear characteristic curve 34. In principle, however, deviations in the other direction are also conceivable, i.e., injection of a larger fuel quantity, even if this is not explicitly shown in FIG. 3. Deviations dQ, which occur in different versions of the same injector, are plotted over injection time ti in FIG. 3. It is apparent that the deviations are less than 10% up to an injection time $ti_G$. However, the deviations are much greater in the case of even smaller injection times ti. To be able to use this range, a method for adjusting characteristic curve 34 is used, which is explained in detail below with reference to FIGS. 4 through 6 (this method is stored as a computer program in a memory device of control and regulating device 36):

The internal combustion engine is first brought into a precisely defined operating state. In this state, the internal combustion engine must have a specific operating temperature, an adjustment of a lambda controller must have been completed, no errors may have been entered in control and regulating device 36, the voltage of a vehicle electric system must have a specific minimum value, etc. In addition, the method is carried out while the internal combustion engine is idling. This "preparation" of internal combustion engine 10 is carried out in a step 40 of the flow chart illustrated in FIG. 4, this step taking place immediately after starting step 42.

Figure 5:
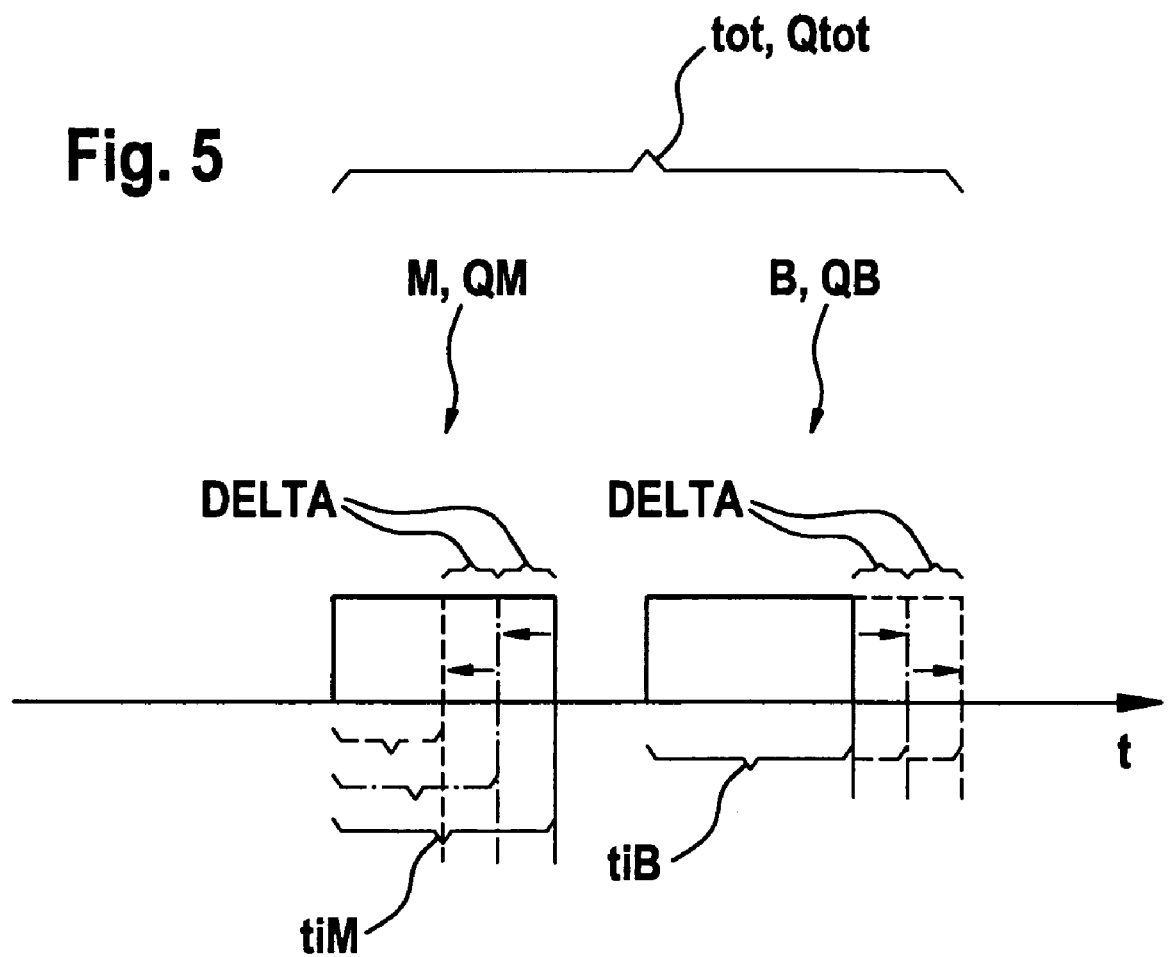
FIG. 5 shows a diagram in which the opening state of the injector from FIG. 1 is plotted over time during a method for adjusting the characteristic curve from FIG. 2.

A total injection quantity is then divided into a basic injection quantity and a measured injection quantity in 44. This is done by dividing a total injection time titot into a basic injection time tiB and a measured injection time tiM. In a simple model, injection time ti includes in simplified form a delay time without fuel input and an effective opening time in which the fuel input is constant. The delay period takes into account the opening and closing operations of injector 18. In the interest of simplicity, the delay time in the exemplary embodiment described here is set to zero. This is shown in FIG. 5, where tot designates a total injection, M designates a measured injection and B designates a basic injection. In this figure, the total injection time is also identified by Qtot, the measured injection quantity by QM and the basic injection quantity by QB.

Injection time tiB for injecting the basic injection quantity and injection time tiM for injecting the measured injection quantity are selected for the start of the method within a range of valve characteristic curve 34 in which it is assumable with a high degree of probability that the deviations of the injected fuel quantity from the injected quantity according to the valve characteristic curve are small. To achieve this in idle mode, it may be necessary to increase the air charge in combustion chamber 12. For example, the ignition angle may be retarded for this purpose.

Figure 4:
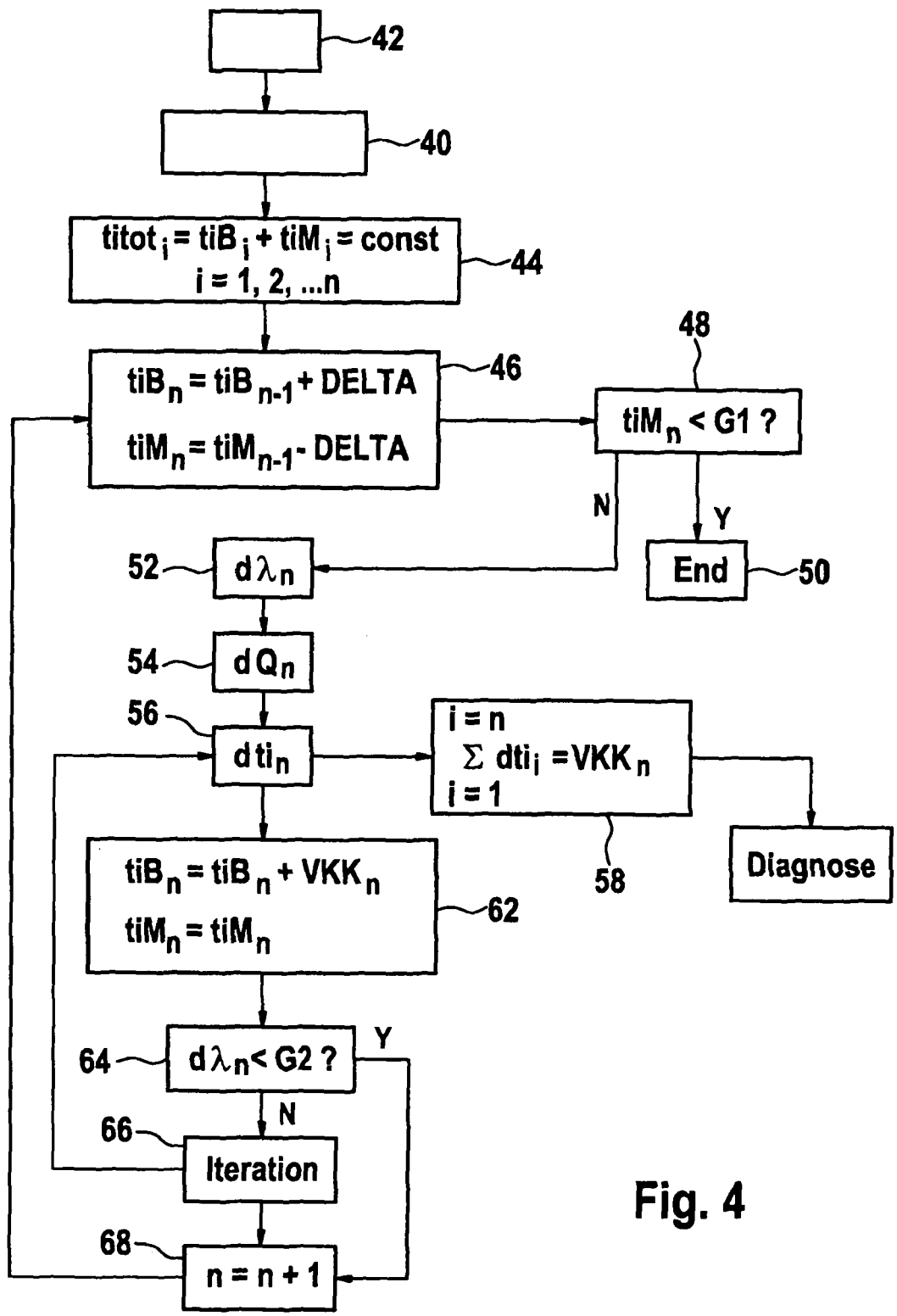
FIG. 4 shows a flow chart for explaining the method for adjusting the characteristic curve from FIG. 2.

As further illustrated in FIG. 4, in a block 46 measured injection time tiM is reduced by a fixed value DELTA, and basic injection time tiB is increased by same fixed value DELTA. This is carried out successively in a method loop or a time step n, building on the values obtained in the previous method loop or previous time step n−1. In a method step 48, measured injection time $tiM_n$ is checked to see whether it is less than a limiting value G1. If this is the case, the method ends in step 50. The logic of this measure is explained in greater detail below.

However, if the answer in block 48 is no, step 52 is carried out to determine a deviation $d\lambda_n$ of an actual lambda value from a setpoint lambda value. From this result, in turn, an error injection quantity $dQ_n$ is ascertained in a block 54, and from this value a corresponding error injection time $dti_n$ is ascertained in a block 56. This is based on the following idea: By increasing basic injection time tiB and reducing measured injection time tiM by the same amount in block 46, total injection quantity Qtot would have to remain the same according to characteristic curve 34. Therefore, if injector 18 behaved according to characteristic curve 34, the actual mixture would have to equal the setpoint mixture, and deviation $d\lambda_n$ in block 52 would have to be zero.

However, the method illustrated in FIG. 4 is successively repeated with basic injection time tiB being gradually increased and measured injection time tiM being gradually reduced by constant value DELTA in each case (see FIG. 5). While basic injection time tiB remains in the range of characteristic curve 34 for which it is known that the actual performance of injector 18 deviates only slightly from the ideal performance according to characteristic curve 34, injection time tiM of measured injection M continues to move farther into range 38 of characteristic curve 34, in which the ideal linear correlation no longer exists.

Figure 3:
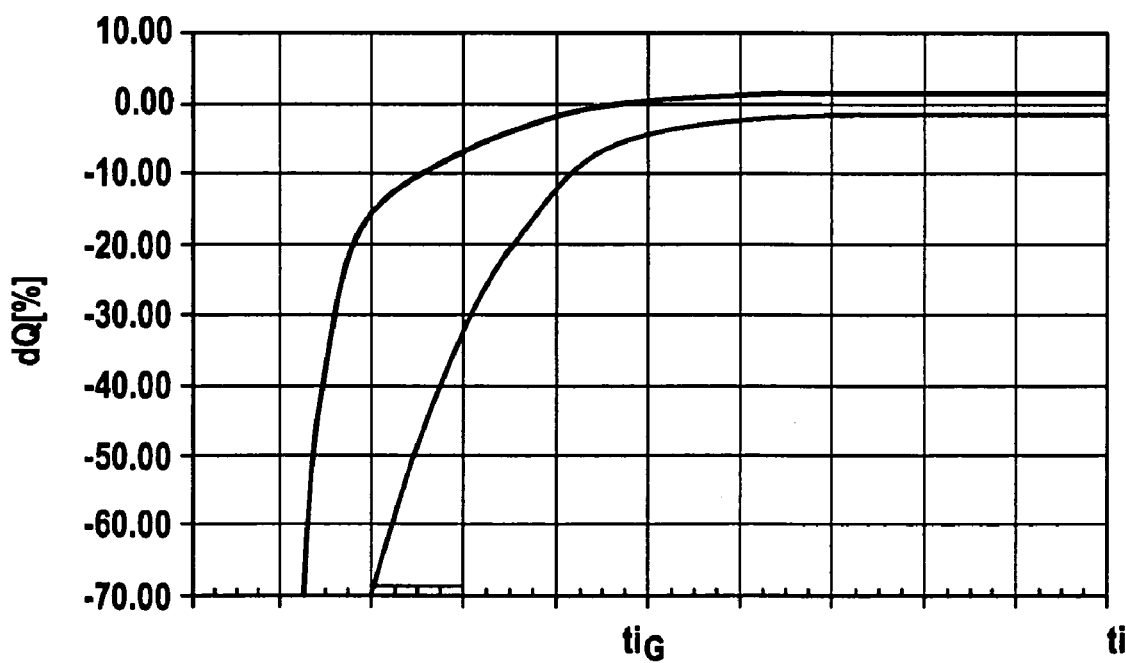
FIG. 3 shows a diagram that illustrates possible deviations of the injected fuel quantity from the characteristic curve shown in FIG. 2, in the case of short opening times.

In the exemplary embodiment according to the diagram in FIG. 3, injector 18 injects a quantity of fuel during injection times $\ll ti_G$ which would be less than the quantity corresponding to characteristic curve 34. The actual measured injection quantity therefore decreases in relation to measured injection quantity QM according to characteristic curve 34. As a result, the actual total injection quantity is also less than total injection quantity Qtot according to characteristic curve 34. The mixture is therefore leaner than planned, which is detected in block 52 as deviation $d\lambda_n$. Error injection time $dti_n$ ascertained in block 56 is the injection time by which basic injection time $tiB_n$ would have to be increased to ensure that the actual mixture corresponds to the setpoint mixture.

In 58, a correction value $VKK_n$ by which valve characteristic curve 34 must be corrected so that even very small injection quantities are injectable with a high degree of precision is formed from the sum of error injection times $dti_n$ via time steps 1 through n. By way of example, error injection times $dti_i$ are plotted in FIG. 6 for time steps i=n−1, n and n+1. The figure shows that a correction characteristic curve VKK, which is identified by reference numeral 60 in FIG. 6, may be formed from the total for time step i.

Figure 6:
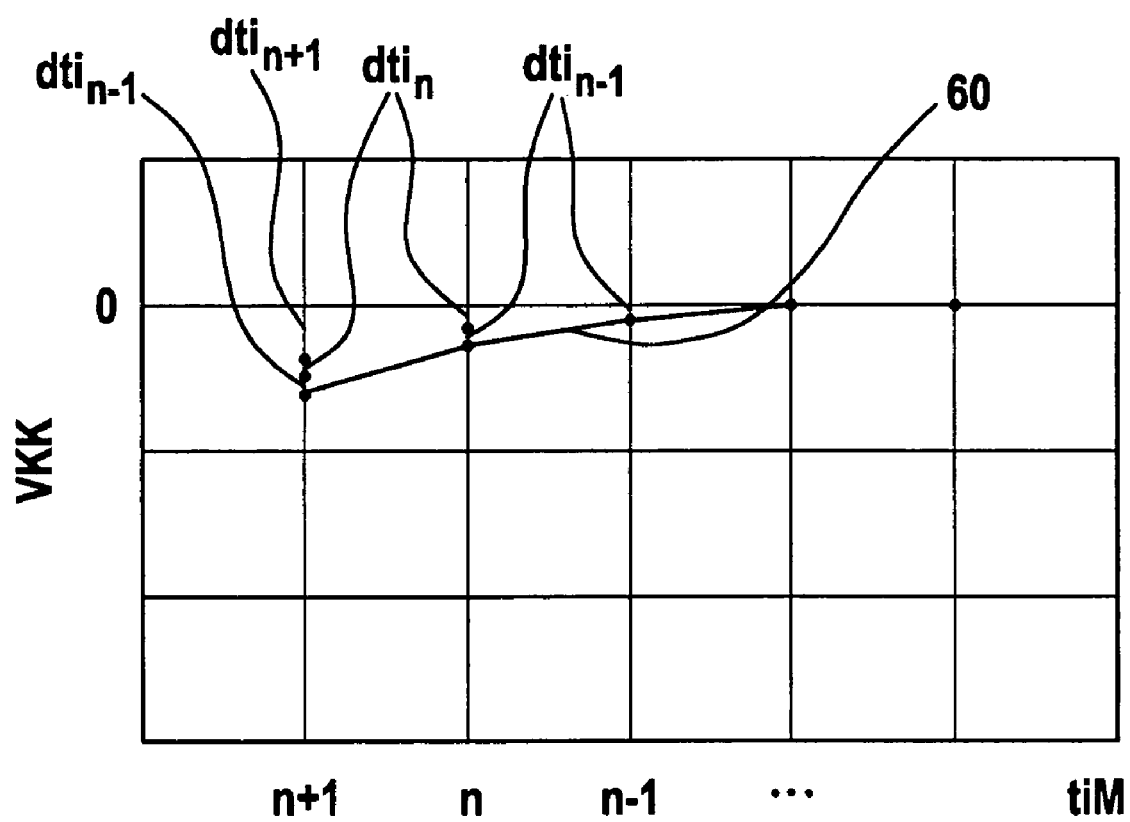
FIG. 6 shows a diagram in which correction values are plotted for the valve characteristic curve from FIG. 2 during different injection times.

To check whether the deviation of the actual performance of injector 18 from the ideal performance according to characteristic curve 34 may be corrected by correction value $VKK_n$ ascertained in 58, correction value $VKK_n$ is added to basic injection time $tiB_n$ in 62. Measured injection time $tiM_n$ remains unchanged according to block 46. In block 64, deviation $d\lambda_n$ is then checked to see whether it is now less than a limiting value G2. If this is not the case, an iteration is initiated in block 66, which, by varying error injection time dti in 56, reduces the deviation of the actual mixture from the setpoint mixture until lambda deviation $d\lambda_n$ is less than limiting value G2 in 64. In 68, the next interpolation point of characteristic curve 34 is then processed by incrementing step counter i and returning to 46. In this manner, correction characteristic curve 60 shown in FIG. 6 is gradually increased until measured injection time $tiM_i$ drops below limiting value G1 in 48. The method then ends in block 50, as described above. The next valve characteristic curve, if present, may then be adjusted. This applies in particular to internal combustion engines having direct fuel injection, where all cylinders may be adjusted successively.

As shown in FIG. 4, method step 58, in which interpolation points $VKK_n$ are formed for correction characteristic curve 60, may be followed by a diagnosis 70. During this diagnosis, correction characteristic curve 60 is compared with a limiting curve and, if it exceeds the latter, a warning is issued and/or an entry is made in an error memory. This is based on the idea that a substantial change in the linearity of characteristic curve 34 in the range of small injection quantities may indicate an error in injector 18, for example a short-circuit in a coil winding of a magnet coil belonging to an actuator of injector 18.

In the exemplary embodiment described above, total injection time titot is divided in 44 into a basic injection time tiB and a single measured injection time tiM. To increase the resolution, however, a plurality of measured injections of equal length may also be provided. Value DELTA, by which the basic injection time is increased, must therefore equal the sum of the reductions in the individual measured injection times in 46.

What is claimed is:

1. A computer-readable electronic storage medium for storing a computer program having a plurality codes which, when executed on a computer, performs a method for fuel-injection into at least one combustion chamber of an internal combustion engine via at least one injector, the method comprising:
    (a) dividing a total injection quantity into a basic injection and at least one measured injection, wherein an injection time of the basic injection and an injection time of the measured injection are specified, and wherein n=1 is set for steps (b) through (e);
    (b) reducing the injection time $tiM_n$ of the measured injection and increasing the injection time $tiB_n$ of the basic injection in such a way that the total injection quantity remains the same;
    (c) ascertaining a deviation $d\lambda_n$, resulting from step (b), of a variable characterizing an actual mixture from a variable characterizing a setpoint mixture;
    (d) ascertaining an error injection time $dti_n$ based on the deviation $d\lambda_n$ of the variable characterizing the actual mixture from the variable characterizing the setpoint mixture for the injection time $tiM_n$ of the measured injection;
    (e) forming a correction value $VKK_n$ as the sum of the error injection times $dti_i$ over the time steps i=1 through n, and adjusting a characteristic of the at least one injector by the correction value $VKK_n$ during the injection time $tiM_n$ of the measured injection; and
    (f) increasing the value of n by 1, and repeating steps (b) through (e) at least once.

2. A control device for controlling the operation of an internal combustion engine, comprising:
    a means for controlling a method of fuel-injection into at least one combustion chamber of an internal combustion engine via at least one injector, wherein the method includes:
        (a) dividing a total injection quantity into a basic injection and at least one measured injection, wherein an injection time of the basic injection and an injection time of the measured injection are specified, and wherein n=1 is set for steps (b) through (e);
        (b) reducing the injection time $tiM_n$ of the measured injection and increasing the injection time $tiB_n$ of the basic injection in such a way that the total injection quantity remains the same;
        (c) ascertaining a deviation $d\lambda_n$, resulting from step (b), of a variable characterizing an actual mixture from a variable characterizing a setpoint mixture;
        (d) ascertaining an error injection time $dti_n$ based on the deviation $d\lambda_n$ of the variable characterizing the actual mixture from the variable characterizing the setpoint mixture for the injection time $tiM_n$ of the measured injection;
        (e) forming a correction value $VKK_n$ as the sum of the error injection times $dti_i$ over the time steps i=1 through n, and adjusting a characteristic of the at least one injector by the correction value $VKK_n$ during the injection time $tiM_n$ of the measured injection; and (f) increasing the value of n by 1, and repeating steps (b) through (e) at least once.

3. A method for fuel-injection into at least one combustion chamber of an internal combustion engine via at least one injector, comprising:
(a) dividing a total injection quantity into a basic injection and at least one measured injection, wherein an injection time of the basic injection and an injection time of the measured injection are specified, and wherein n=1 is set for steps (b) through (e);
(b) reducing the injection time $tiM_n$ of the measured injection and increasing the injection time $tiB_n$ of the basic injection in such a way that the total injection quantity remains the same;
(c) ascertaining a deviation $d\lambda_n$, resulting from step (b), of a variable characterizing an actual mixture from a variable characterizing a setpoint mixture;
(d) ascertaining an error injection time $dti_n$ based on the deviation $d\lambda_n$ of the variable characterizing the actual mixture from the variable characterizing the setpoint mixture for the injection time $tiM_n$ of the measured injection;
(e) forming a correction value $VKK_n$ as the sum of the error injection times $dti_i$ over the time steps i=1 through n, and adjusting a characteristic of the at least one injector by the correction value $VKK_n$ during the injection time $tiM_n$ of the measured injection; and
(f) increasing the value of n by 1, and repeating steps (b) through (e) at least once.

4. The method as recited in claim 3, further comprising:
ending the method when the injection time $tiM_n$ of the measured injection reaches a specified lower limiting value.

5. The method as recited in claim 3, wherein the total injection includes multiple measured injections of equal length.

6. The method as recited in claim 3, wherein a delay time of the injector is taken into account when varying the injection time of the measured injection and the injection time of the basic injection.

7. The method as recited in claim 3, wherein the adjusted characteristic of the at least one injector from step (e) is evaluated to diagnose the injector.

8. The method as recited in claim 3, further comprising:
performing, after step (d), a step of varying the injection time $tiB_n$ of the basic injection by the correction value $VKK_n$, formed as the sum of the error injection times $dti_i$ over the time steps i=1 through n.

9. The method as recited in claim 8, wherein the correction value $VKK_n$ formed as the sum of the error injection times $dti_i$ over the time steps i=1 through n is adjusted so that the variable characterizing the actual mixture deviates from the variable characterizing the setpoint mixture by less than a specified limiting value.

* * * * *